(12) United States Patent
Du et al.

(10) Patent No.: US 11,523,041 B2
(45) Date of Patent: Dec. 6, 2022

(54) CAMERA MODULE AND ELECTRONIC DEVICE

(71) Applicant: GUANGZHOU LUXVISIONS INNOVATION TECHNOLOGY LIMITED, Guangzhou (CN)

(72) Inventors: HaiChao Du, Guangzhou (CN); JiJi Zhong, Guangzhou (CN); Rui Zhang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 17/358,007

(22) Filed: Jun. 25, 2021

(65) Prior Publication Data
US 2022/0006935 A1    Jan. 6, 2022

(30) Foreign Application Priority Data
Jul. 1, 2020 (CN) .......................... 202021256342.7

(51) Int. Cl.
*H04N 5/225* (2006.01)
*G02B 7/02* (2021.01)

(52) U.S. Cl.
CPC ........... *H04N 5/2257* (2013.01); *G02B 7/021* (2013.01); *H04N 5/2254* (2013.01)

(58) Field of Classification Search
CPC .. H04N 5/2257; H04N 5/2254; H04N 5/2253; G02B 7/021; G02B 7/022
See application file for complete search history.

(56) References Cited

U.S. PATENT DOCUMENTS

| | | | |
|---|---|---|---|
| 2009/0135297 A1* | 5/2009 | Wu | H04N 5/2257 348/374 |
| 2013/0242183 A1* | 9/2013 | Lee | H04N 5/2253 348/374 |
| 2021/0352198 A1* | 11/2021 | Tang | H04N 5/2257 |

FOREIGN PATENT DOCUMENTS

CN        108259724 A * 7/2018 ........... H04N 5/2251

\* cited by examiner

*Primary Examiner* — Abdelaaziz Tissire

(57) ABSTRACT

The present disclosure provides a camera module and an electronic device. The camera module comprises a bearing base, an image sensor, a baseplate, a lens bracket, and a lens group. The image sensor is disposed at the bearing base. The baseplate is disposed at the bearing base and is separated from the image sensor. The baseplate is disposed on the periphery of the image sensor. The baseplate is electrically connected with the image sensor. The lens bracket is disposed at the bearing base. The image sensor and a part of the baseplate are disposed in the lens bracket. The lens bracket comprises a photosensitive through hole. The image sensor corresponds to the photosensitive through hole. The lens group is disposed at the lens bracket and corresponds to the image sensor through the photosensitive through hole.

9 Claims, 5 Drawing Sheets

CAMERA MODULE AND ELECTRONIC DEVICE

CROSS-REFERENCE TO RELATED APPLICATION

This application claims the priority benefit of Chinese Patent Application Serial Number 202021256342.7, filed on Jul. 1, 2020, the full disclosure of which is incorporated herein by reference.

BACKGROUND

Technical Field

The present disclosure relates to the technical field of camera module, particularly to a camera module and an electronic device.

Related Art

Conventional camera module is basically an optical system comprising a lens and an image sensor. The signal of the image sensor can be transmitted through a baseplate. In the prior art, for transmission of the signal of the image sensor, when manufacturing camera modules, a baseplate is firstly placed on a base of camera module, then an image sensor is placed on the baseplate, and finally the baseplate and the image sensor are connected by wire bonding. As a result, the baseplate is disposed in the camera module to carry the image sensor, which increases the height of the camera module. Thus, such camera modules cannot be applied to thin electronic devices.

SUMMARY

The embodiments of the present disclosure provide a camera module and an electronic device tended to solve the problem that conventional camera modules are too high to be applied in thin electronic devices.

On the first aspect, the present disclosure provides a camera module, comprising a bearing base, an image sensor, a baseplate, a lens bracket, and a lens group. The image sensor is disposed at the bearing base. The baseplate is disposed at the bearing base and is separated from the image sensor. The baseplate is disposed on the periphery of the image sensor. The baseplate is electrically connected with the image sensor. The lens bracket is disposed at the bearing base. The image sensor and a part of the baseplate are disposed in the lens bracket. The lens bracket comprises a photosensitive through hole. The image sensor corresponds to the photosensitive through hole. The lens group is disposed at the lens bracket and corresponds to the image sensor through the photosensitive through hole.

On the second aspect, the present disclosure provides an electronic device, comprising a housing and a camera module according to the first aspect. The camera module is disposed in the housing.

In the embodiments of the present disclosure, by directly disposing the image sensor and the lens bracket on the bearing base, the image sensor and the baseplate can be horizontally disposed on the bearing base at the same level at intervals. Thus, the image sensor would not be stacked on the baseplate, and the baseplate would not be disposed between the lens bracket and the bearing base, thereby the height of the camera module can be reduced.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of bearing out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . ." does not exclude other same elements existing in the process, the method, the article, or the device which includes the element.

Figure 1:
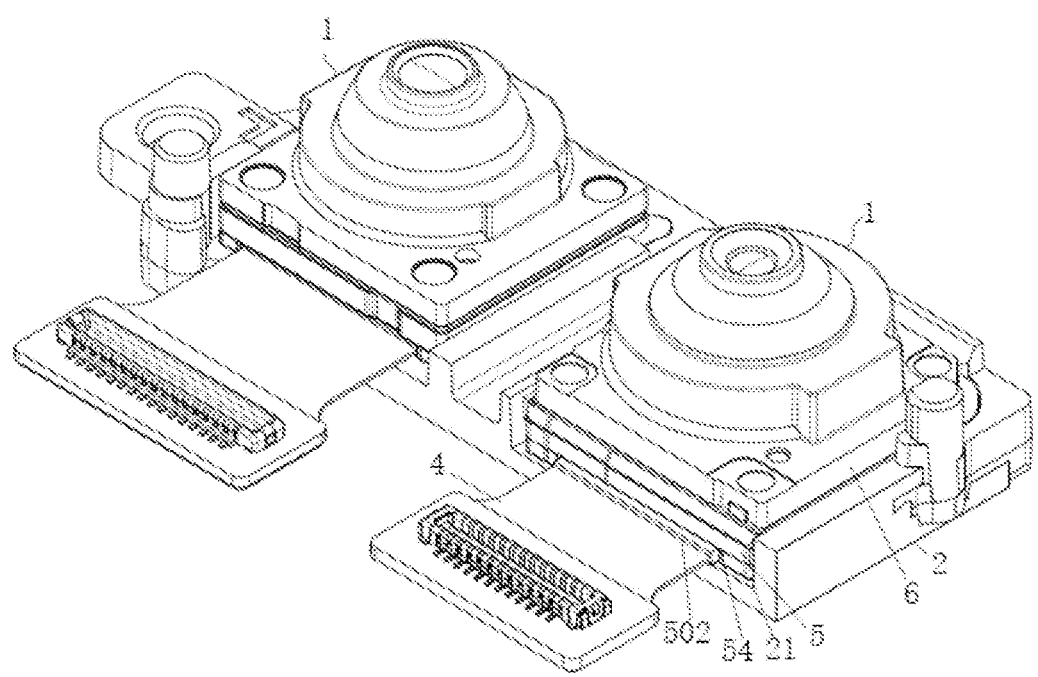
FIG. 1 is a perspective view of a camera module of the first embodiment of the present disclosure.
Figure 2:
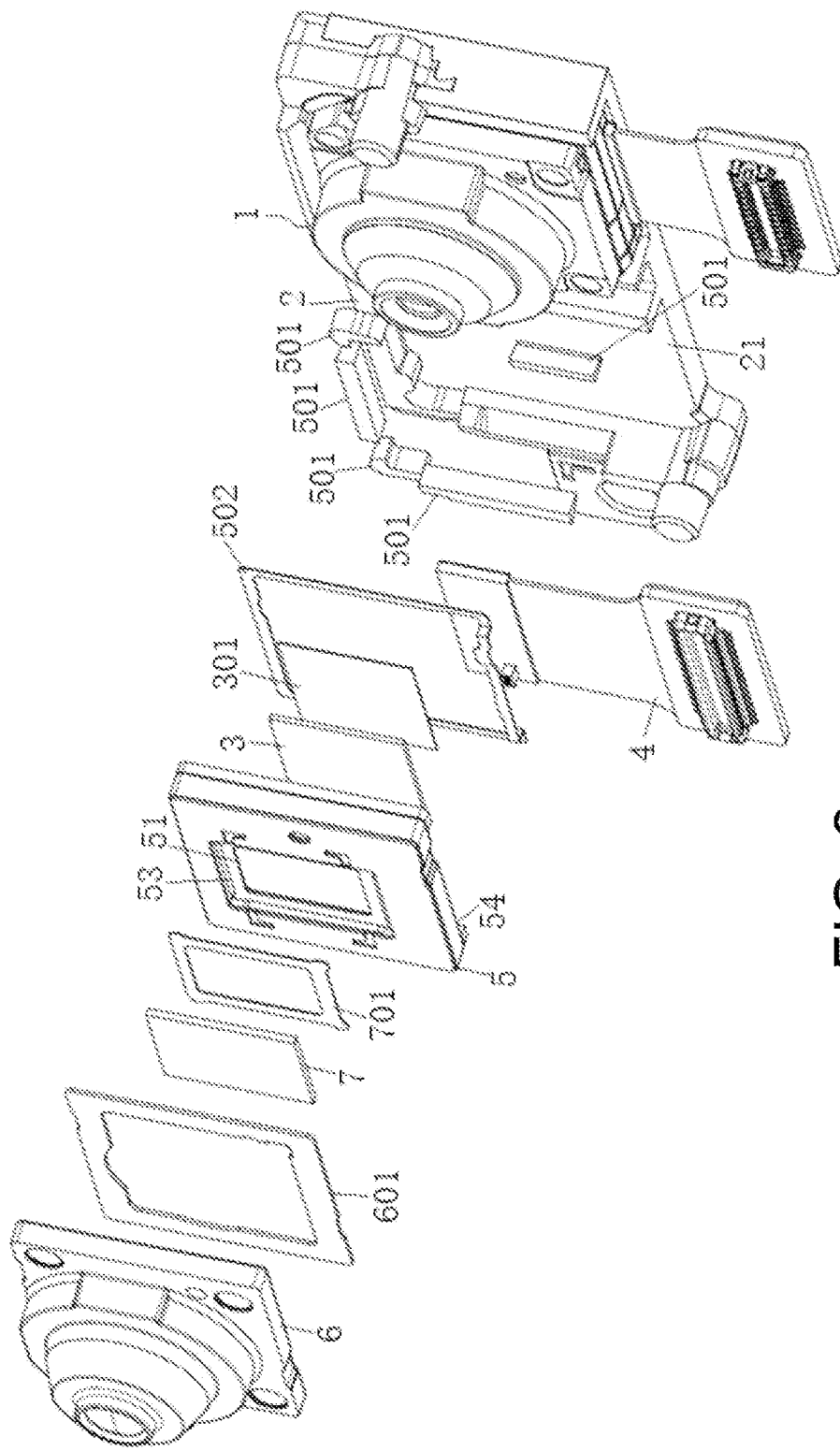
FIG. 2 is a partially exploded view of FIG. 1.
Figure 3:
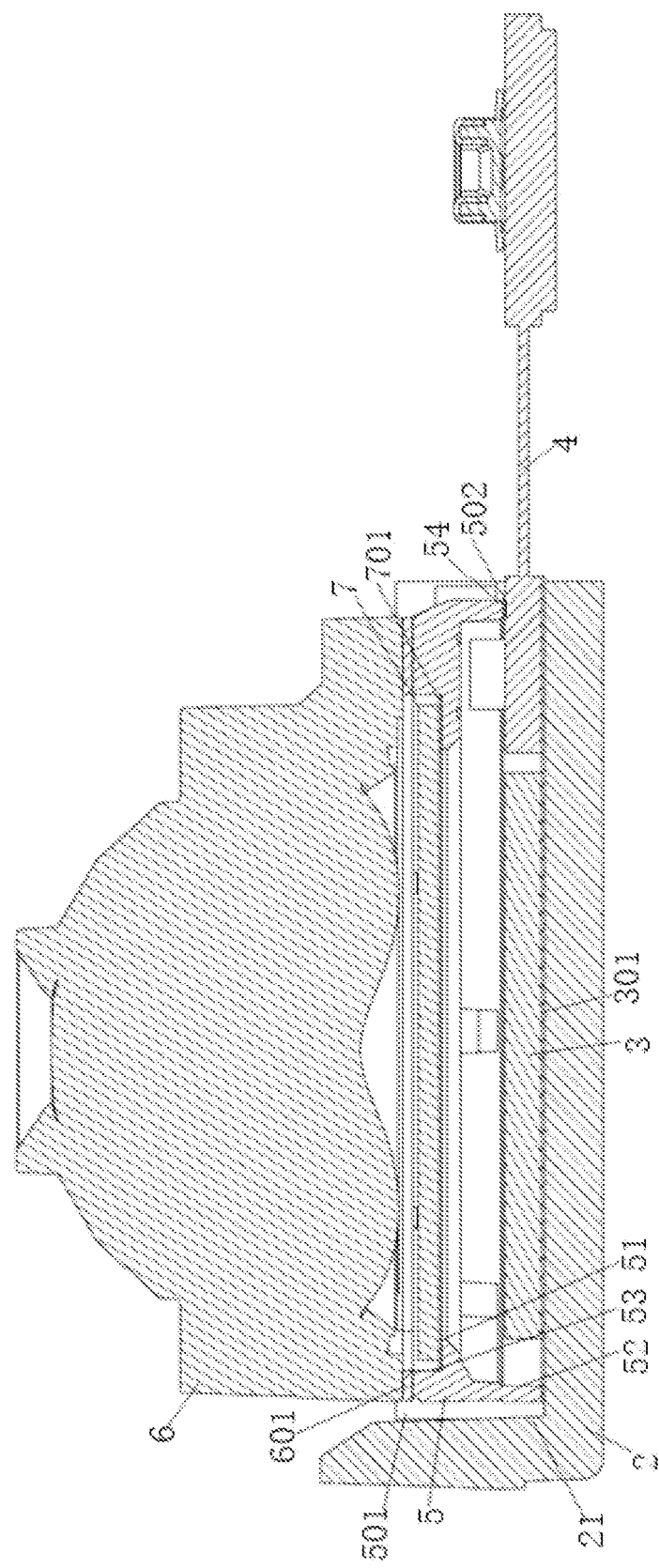
FIG. 3 is a cross-sectional view of the camera module of the first embodiment of the present disclosure.

FIG. 1 is a perspective view of a camera module of the first embodiment of the present disclosure. FIG. 2 is a partially exploded view of FIG. 1. FIG. 3 is a cross-sectional view of the camera module of the first embodiment of the present disclosure. As shown in the figures, in this embodiment, the number of camera module 1 is two. The two camera modules 1 are arranged side by side and are mutually connected through two bearing bases 2. In this embodiment, the two bearing bases 2 are integrally formed. In other embodiments, the two bearing bases 2 can be separated, that is, each of the camera modules 1 is not connected to the others. Each of the camera modules 1 comprises a bearing base 2, an image sensor 3, a baseplate 4, a lens bracket 5, and a lens group 6. In this embodiment, during assembling of the camera module 1, the image sensor 3 and the baseplate 4 are disposed on the same plane as the bearing base 2, which is, the image sensor 3 and the baseplate 4 are disposed in a non-stacked manner. The baseplate 4 could be disposed at the periphery of the image sensor 3. The baseplate 4 and the image sensor 3 are disposed separately. For example, the baseplate 4 can be disposed at one side of the image sensor 3, or the baseplate 4 comprises a hollow area, in which the image sensor 3 is disposed, or the baseplate 4 could be disposed at one side of at least two side edges of the image sensor 3 to ensure that the baseplate 4 would not occupy or increase the height of the lens bracket 5 when installing the lens bracket 5. In this embodiment, the baseplate 4 is disposed at one side of the image sensor 3. As shown in FIG. 3, the baseplate 4 is disposed on the right side of the image sensor 3, and the baseplate 4 is electrically connected to the image sensor 3. The lens bracket 5 is disposed at the bearing base 2, and the image sensor 3 and a part of the baseplate 4 are disposed in the lens bracket 5. The lens bracket 5 comprises a photosensitive through hole 51, and the image sensor 3 corresponds to the photosensitive through hole 51. That is, the image sensor 3 is disposed directly below the photosensitive through hole 51. The lens group 6 is disposed at the lens bracket 5 and corresponds to the image sensor 3 through the photosensitive through hole 51.

Figure 4:
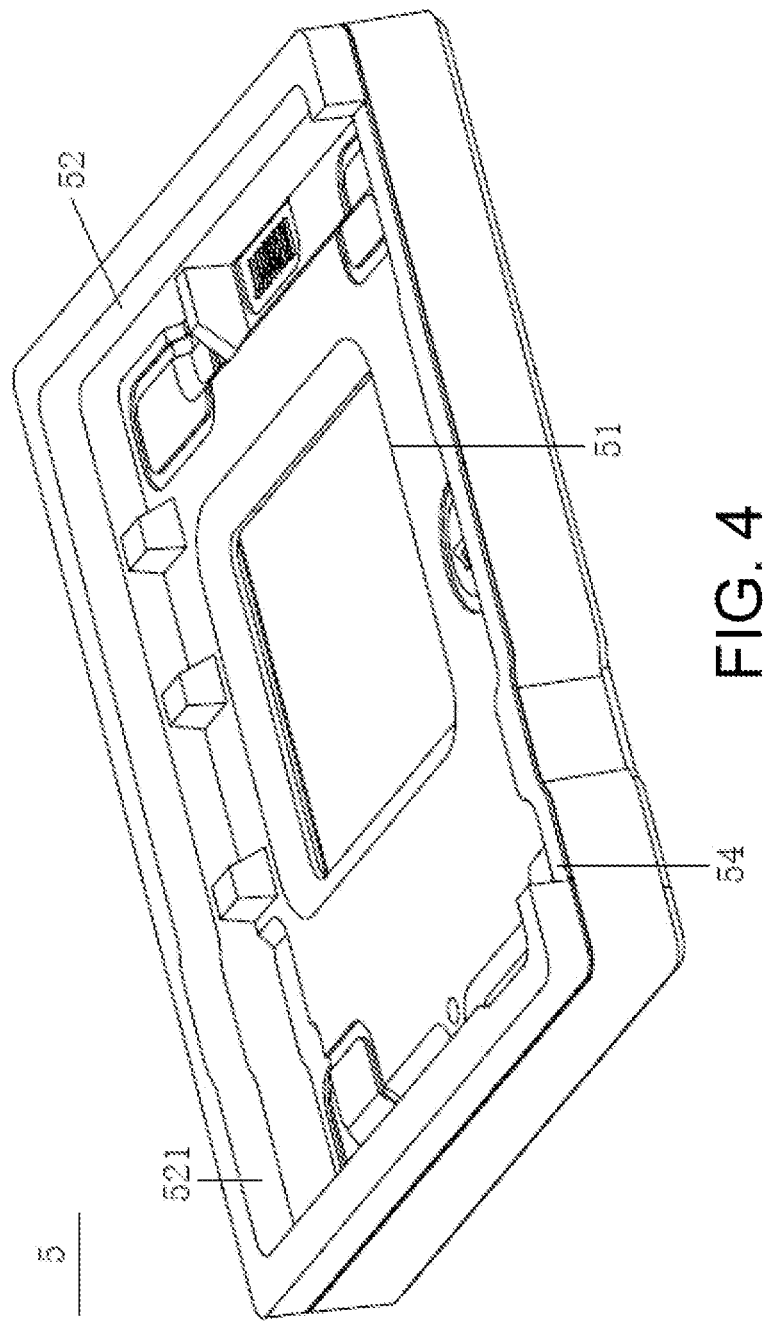
FIG. 4 is a perspective view of a lens bracket of the first embodiment of the present disclosure.

FIG. 4 is a perspective view of a lens bracket of the first embodiment of the present disclosure. As shown in the figure, the lens bracket 5 comprises a first accommodating groove 52. The photosensitive through hole 51 is disposed on a surface of the first accommodating groove 52 away from the bearing base 2 and is communicating with the first accommodating groove 52. The image sensor 3 and a part of the baseplate 4 are disposed in the first accommodating groove 52. The lens group 6 is disposed on a surface of the lens bracket 5 away from the bearing base 2. Specifically, the first accommodating groove 52 of the lens bracket 5 comprises four sidewalls 521, which are adjacent to a surface of the bearing base 2. One of the sidewalls 521 comprises a recess 54, and a part of the baseplate 4 extends from the recess 54 to the outside of the lens bracket 5. Specifically, the recess 54 is disposed at one end of one of the sidewalls 521 close to the bearing base 2.

In this embodiment, in the camera module 1, since the image sensor 3 and the lens bracket 5 are directly disposed on the bearing base 2, and the image sensor 3 and the baseplate 4 are horizontally disposed on the bearing base 2 at intervals, the baseplate 4 would not be stacked with the image sensor 3, nor would it be disposed between the lens bracket 5 and the bearing base 2. Specifically, the four sidewalls 521 of the lens bracket 5 would not all be disposed on the baseplate 4, so that the height of the camera module 1 can be reduced.

In the first embodiment, the baseplate 4 is a circuit board. In this embodiment, the baseplate 4 is a flexible circuit board. In this embodiment, the baseplate 4 is connected with the image sensor 3 through a gold wire, which allows the realization of an electrical connection between the image sensor 3 and the baseplate 4, and the gold wire is covered and shielded by the lens bracket 5. In other words, the connection between the image sensor 3 and the baseplate 4 is below the lens bracket 5, which keeps dust or impurities outside the camera module 1 from contaminating the gold wire and affecting the electrical connection performance, and also keep the residual dust on the gold wire from contaminating the image sensor 3.

In the first embodiment, the bearing base 2 comprises an accommodating groove 21. The image sensor 3, the baseplate 4, and the lens bracket 5 are disposed at the bottom of the accommodating groove 21. The image sensor 3 is completely accommodated in the accommodating groove 21, and the lens bracket 5 is at least partially accommodated in the accommodating groove 21 to reduce the overall height of the camera module 1. The bearing base 2 is an integrally formed and inject-molded component. Specifically, a first adhesive layer 301 is disposed between the bottom of the accommodating groove 21 and the image sensor 3, so that the image sensor 3 is adhesively fixed to the bottom of the accommodating groove 21 through the first adhesive layer 301. A second adhesive layer 501 is disposed between a sidewall of the accommodating groove 21 and the lens bracket 5, allowing the lens bracket 5 to be adhesively fixed to the sidewall of the accommodating groove 21, so that the reliability of the lens bracket 5 can be maintained stable. A third adhesive layer 502 is disposed between an end surface of the lens bracket 5 close to the bearing base 2 and the bottom of the accommodating groove 21 and between the end surface of the lens bracket 5 close to the bearing base 2 and the baseplate 4. Specifically, the third adhesive layer 502 is applied between the end surface of the lens bracket 5 close to the bearing base 2 and the bottom of the accommodating groove 21 and between the recess 54 and the baseplate 4 to fix the lens bracket 5 onto the bearing base 2 and the baseplate 4. A lens assembly adhesive layer 601 is disposed between the lens bracket 5 and the lens group 6 to bond and fix the lens group 6 onto the lens bracket 5.

In the first embodiment, the camera module 1 further comprises a filter 7. The filter 7 is disposed on the lens bracket 5 and is disposed between the image sensor 3 and the lens group 6. In this embodiment, the lens bracket 5 further comprises a second accommodating groove 53 disposed on the surface of the lens bracket 5 away from the bearing base 2. The photosensitive through hole 51 is communicating with the second accommodating groove 53 and penetrates the first accommodating groove 52 and the second accommodating groove 53. The filter 7 is disposed in the second accommodating groove 53 and covers the photosensitive through hole 51. Specifically, the shape of the second accommodating groove 53 is adapted to the shape of the filter 7, and a filter assembly adhesive layer 701 is disposed between the lens bracket 5 and the filter 7 to fix the filter 7 to the bottom of the second accommodating groove 53 of the lens bracket 5. The material of the filter assembly adhesive layer 701 is a resin glue, which could bear the filter 7 when cured, and could fix the filter 7 onto the lens bracket 5.

Figure 5:
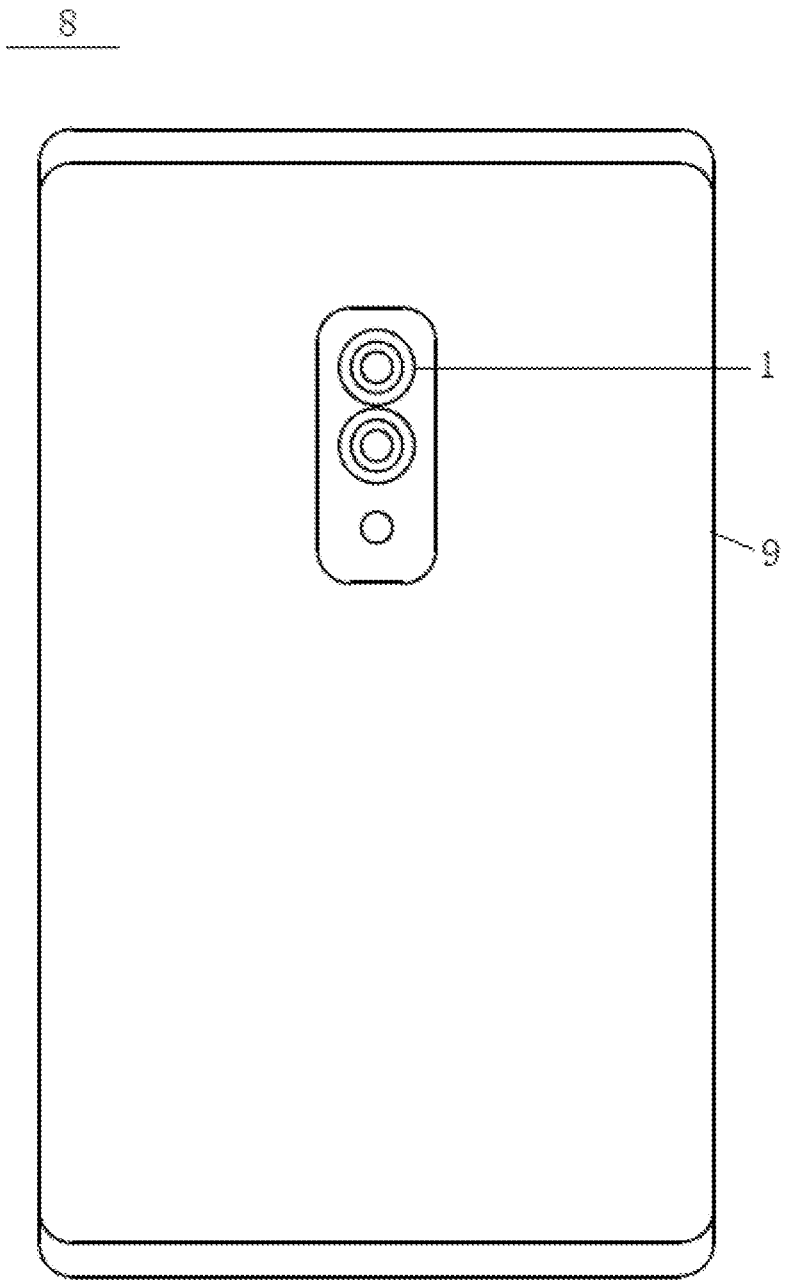
FIG. 5 is a schematic view of an electronic device of the second embodiment of the present disclosure.

FIG. 5 is a schematic view of an electronic device of the second embodiment of the present disclosure. As shown in the figure, an electronic device 8 comprises a housing 9 and a camera module 1 shown in the first embodiment. The camera module 1 is disposed in the housing 9. Specifically, the bearing base 2 in the camera module 1 is attached to the housing 9, and a device housing covers the entire camera module 1. The device housing is provided with a transparent opening window for the lighting for the lens group 6, whose specific structural configuration can be referred to the camera configuration in the electronic device 8. However, the attachment method is not limited in the present disclosure.

In this embodiment, the number of camera modules 1 can be one, forming a single-camera module to be assembled on the housing 9. The number of camera modules 1 can be two or more than two to form a multi-camera module to be assembled on the housing 9, it can be arranged horizontally or vertically along one straight line, and can also be arranged in an array or along one circumference, etc., which is not specifically limited herein. The electronic device 8 in this embodiment comprises, but is not limited to, a mobile phone, a laptop computer, a tablet, etc. In this embodiment, a mobile phone is taken as an example for illustration.

In summary, embodiments of the present disclosure provide a camera module and an electronic device. In the camera module, by directly disposing the image sensor and the lens bracket on the bearing base, the image sensor and the baseplate can be horizontally disposed on the bearing base at the same level at intervals. Thus, the image sensor would not be stacked on the baseplate, and the baseplate would not be disposed between the lens bracket and the bearing base, thereby the height of the camera module can be reduced.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure comprises been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera module, comprising:
   a bearing base comprising an accommodating groove;
   an image sensor disposed on the bearing base;
   a baseplate disposed at the bearing base and separated from the image sensor, the baseplate being disposed at the periphery of the image sensor, the baseplate being electrically connected with the image sensor;
   a lens bracket disposed at the bearing base, the image sensor and a part of the baseplate being disposed in the lens bracket, the lens bracket comprising a photosensitive through hole, the image sensor corresponding to the photosensitive through hole, wherein the lens bracket comprises a first accommodating groove; and
   a lens group disposed at the lens bracket and corresponding to the image sensor through the photosensitive through hole;
   wherein the image sensor, the baseplate, and the lens bracket are disposed at the bottom of the accommodating groove;
   wherein the image sensor and a part of the baseplate are disposed in the first accommodating groove, and an electrical connection position of the image sensor and the baseplate is covered and shielded by the lens bracket.

2. The camera module according to claim 1, wherein the baseplate is a circuit board; the baseplate is electrically connected with the image sensor.

3. The camera module according to claim 1 comprising a first adhesive layer disposed between the bottom of the accommodating groove and the image sensor.

4. The camera module according to claim 1 comprising a second adhesive layer disposed between a sidewall of the accommodating groove and the lens bracket.

5. The camera module according to claim 1, wherein the photosensitive through hole is disposed on a surface of the first accommodating groove away from the bearing base and is communicating with the first accommodating groove; the lens group is disposed on a surface of the lens bracket away from the bearing base.

6. The camera module according to claim 5 comprising a third adhesive layer disposed between an end surface of the lens bracket close to the bearing base and the bottom of the accommodating groove and disposed between the end surface of the lens bracket close to the bearing base and the baseplate.

7. The camera module according to claim 5 comprising a filter disposed on the lens bracket and disposed between the image sensor and the lens group.

8. The camera module according to claim 7, wherein the lens bracket further comprises a second accommodating groove disposed on the surface of the lens bracket away from the bearing base; the photosensitive through hole is in communication with the second accommodating groove; the photosensitive through hole penetrates the first accommodating groove and the second accommodating groove; the filter is disposed in the second accommodating groove and covers the photosensitive through hole.

9. An electronic device, comprising:
   a housing; and
   a camera module according to claim 1, the camera module being disposed in the housing.

* * * * *